May 28, 1946. DU WAYNE J. PETERSON Re. 22,760
BURNER CONTROL SYSTEM
Original Filed Feb. 25, 1938
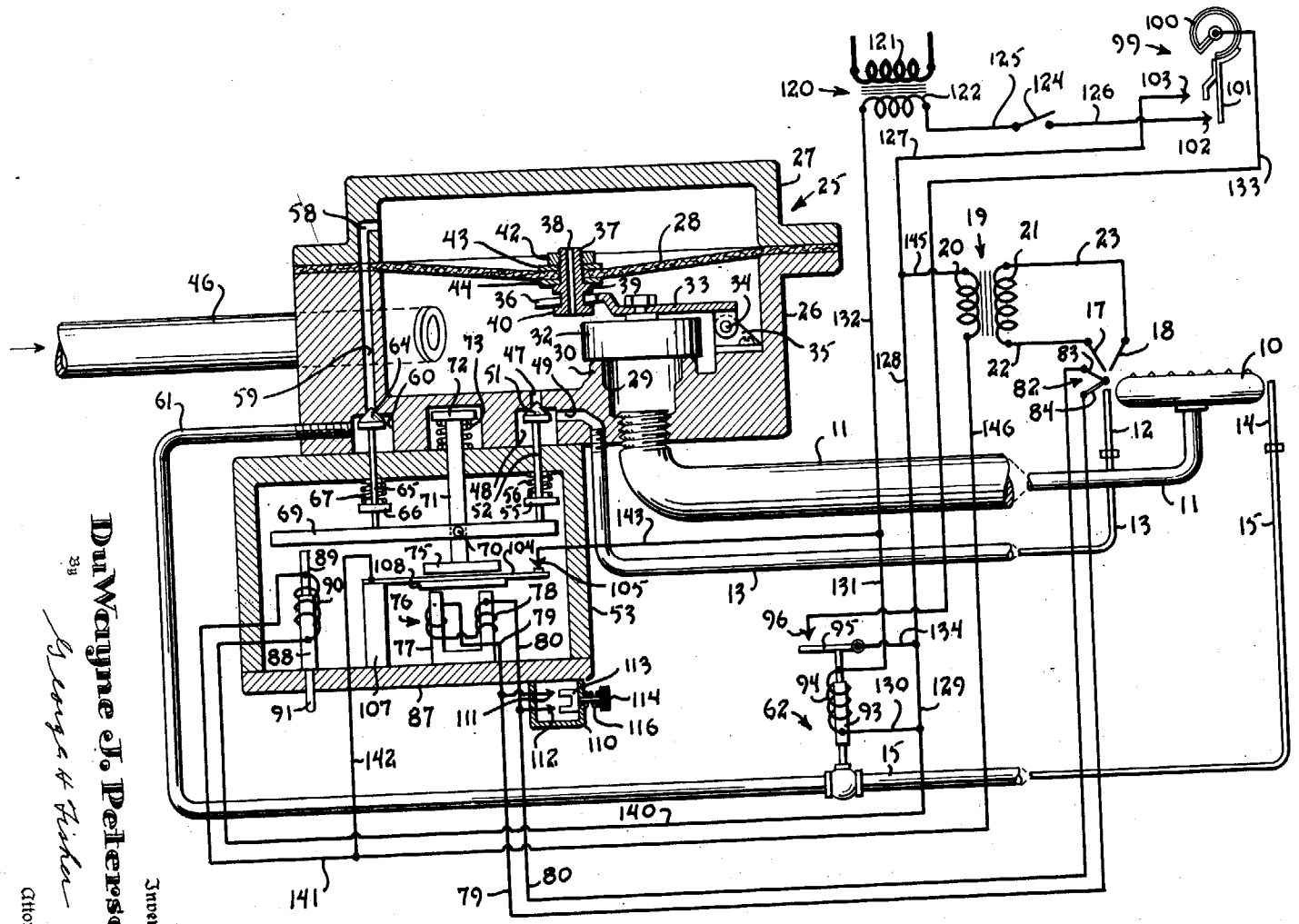
Inventor
DuWayne J. Peterson
By George H. Fisher
Attorney Reissued May 28, 1946

Re. 22,760

UNITED STATES PATENT OFFICE 22,760

BURNER CONTROL SYSTEM

Du Wayne J. Peterson, Grosse Pointe, Mich., assignor to Minneapolis-Honeywell Regulator Company, Minneapolis, Minn., a corporation of Delaware Original No. 2,261,092, dated October 28, 1941, Serial No. 192,515, February 25, 1938. Application for reissue September 25, 1942, Serial No. 459,699

27 Claims. (Cl. 158—117.1)

My invention relates to a burner control system, and more particularly to one employing a pressure motor operated fuel valve.

In the copending application of Frederick D. Joesting, Serial No. 87,716, filed June 27, 1936, now Patent 2,118,886 issued May 31, 1938, there is disclosed a burner control system wherein a pressure motor operated valve is used for controlling the flow of fuel to a main burner and wherein the pressure motor is controlled by a control member which is positioned by an electromagnetic structure comprising an armature and an electromagnet which is of sufficient strength to hold the armature and electromagnet together but of insufficient strength to move the members together. In the device according to this Joesting application, the electromagnet is energized according to the condition of the pilot flame so as to hold the control member for the pressure motor in a position wherein the fuel valve is open so long as the pilot burner is ignited. Manual means is provided in the above described arrangement for effecting the engagement of the armature and electromagnet when these members are separated by deenergization of the electromagnet. The arrangement according to the Joesting application has the disadvantage that it is not adaptable for incorporation in a completely automatic system. The arrangement necessitates manual lighting of the burner and manual manipulation of the resetting means referred to. Since such fuel systems are quite hazardous, particularly where the fuel is gas, it is the customary procedure for the companies in charge of the equipment to send out service men for relighting the pilot burner when it is extinguished. This practice is, of course, extremely costly.

An object of the present invention is to provide a pressure motor operated valve in which a control member therefor is held in one position by an arrangement comprising an armature and electromagnet capable of holding but not of moving the electromagnet and armature together and in which a supplementary motor means is provided for moving the electromagnet and armature together.

A further object of the invention is to provide an arrangement such as set forth in the previous object in which a thermo-couple is employed for energizing the electromagnet.

A further object of the invention is to provide a burner control system employing a valve according to the previous objects for controlling the flow of fuel to a main burner in which the energization of the electromagnet is controlled by means responsive to a condition of the flame of a pilot burner.

A further object of the invention is to provide a burner control system in which a valve controlling the flow of fuel to the burner is held in open position by an electromagnetic arrangement comprising an armature and electromagnet energized in accordance with the condition of the burner flame, in which a power operated motor means is provided for initially moving said armature and electromagnet into engagement, and in which upon energization of said electromagnet, said motor means is deenergized.

A further object of the present invention is to provide a burner control system of the type set forth in the preceding object in which ignition means is provided and in which the motor means and ignition means are energized and deenergized at approximately the same time.

A further object of the invention is to provide an improved burner control system with a normally constantly burning pilot burner in which upon a call for heat and upon the pilot burner being extinguished, the pilot burner is automatically reignited.

Other objects of the invention will be apparent from a consideration of the accompanying specification, claims and drawing.

In the single figure of the drawing, the burner control system of the present invention is shown in schematic form. For a more detailed understanding of the present invention, reference is made to this drawing.

In the drawing, a gas burner is designated by the reference numeral 10. This gas burner may be of any suitable conventional form. The burner is supplied with gas through a pipe 11. Associated with the main burner 10 is a pilot burner 12 supplied with gas through a pipe 13. Also located adjacent to the burner 10 is a bleed gas burner 14 which is supplied with gas by a pipe 15. The main burner 10, the pilot burner 12, and the bleed gas burner 14 together with the right-hand portions of the pipes communicating therewith are shown considerably reduced with respect to the rest of the apparatus, in order to more clearly illustrate the novel portion of the invention.

Located adjacent to the pilot burner 12 is a pair of spaced ignition electrodes 17 and 18. These electrodes are energized by a step-up transformer 19 having a low voltage primary 20 and a high voltage secondary 21. The high voltage secondary 21 is connected by conductors 22 and 23 to the electrodes 17 and 18, respectively. It will be obvious that energization of the primary 20 results in a potential being established between electrodes 17 and 18 to cause a spark therebetween.

The pipe 11 is threadedly connected with a valve housing generally designated by the reference numeral 25. This valve housing comprises a lower casing member 26 and an upper casing member 27 between which is clamped a diaphragm 28. The lower casing member 26 is provided with a recessed portion 29 forming an outlet chamber with which communicates the pipe 11. The upper edge of the recessed portion 29 is provided with a flange 30 which forms a valve seat for a valve member 32. Valve member 32 is secured to an arm 33 which is pivotally mounted at 34 on a bracket 35 secured to the lower casing member 26. The left-hand end of the arm 33 is slotted as indicated at 36. Cooperating with this slotted portion is a generally cylindrical member 37 which has an aperture 38 extending longitudinally therethrough. Member 37 is provided with a pair of flanges 39 and 40. The slotted portion 36 of arm 33 extends between the two flanges 39 and 40. A nut 42 serves to clamp member 37 to the diaphragm 28, washers 43 and 44 being placed adjacent to the diaphragm. It will be noted that the assembly formed by the tubular member 37 and arm 33 forms a connection between the diaphragm 28 and the valve 32 whereby any movement of the diaphragm 28 is transmitted to the valve 32. A gas supply pipe 46 is connected with the lower casing member 26. The pipe 46 leads from any suitable source of gas (not shown).

A passage 47 extends through the lower wall of the lower casing member 26, this passage communicating with a pilot valve chamber 48. Chamber 48, in turn, connects with a passage 49, which passage communicates with pipe 13 leading to the pilot burner 12. Controlling the connection between passage 47 and chamber 48 is a pilot valve 51. Pilot valve 51 is provided with a stem 52, which extends through the upper wall of another casing member 53. This casing member 53 is secured to the valve housing 25 by any suitable means not shown, and a portion of the upper wall of the same forms the lower wall of the valve chamber 48. Valve stem 52 is provided with a collar 55 adjacent its lower end and between this collar 55 and the lower surface of the upper wall of casing 53, a spring 56 is interposed. Spring 56 serves to bias valve 51 to open position.

As will be pointed out in more detail later, a certain amount of the gas entering the lower casing member 26 passes through the passage 38 into the upper casing member 27. Communicating with the interior of the casing member 27 is a passage 58 which, in turn, communicates with a passage 59. Passage 59 is, in turn, adapted under certain circumstances to communicate with a control valve chamber 60. The control valve chamber 60, in turn, is connected with a pipe 61, which is connected through a valve 62 with a pipe 15 leading to the bleed gas burner 14. Communication between passage 59 and valve chamber 60 is controlled by a valve 64 which is provided with a valve stem 65 extending through the upper wall of casing member 53. As in the case of the pilot valve 51, the valve stem 65 of valve 64 is provided with a collar 66 adjacent its lower end and interposed between this collar and the lower surface of the upper wall of casing member 53 is a spring 67 which serves to bias valve 64 towards open position.

With all of the burners completely extinguished, the valves 51 and 64 are biased to closed position in spite of springs 56 and 67. It will be noted that a lever member 69 abuts the lower end of both valve stems 65 and 52. This lever member 69 is pivoted at 70 to a stem member 71, which stem member is provided at its upper end with a flange 72. The stem member 71 extends through the upper wall of casing member 53 and interposed between flange 72 and this upper wall is a spring 73. The spring 73 is sufficiently stronger than springs 67 and 56 that when spring 73 is free to act, the valves 64 and 51 are moved to their seats in spite of springs 67 and 56. Under certain circumstances, however, the action of spring 73 is constrained. It will be noted that stem member 71 is secured at its lower end to an armature member 75, which is of suitable material of high magnetic susceptibility. Armature member 75 is adapted to cooperate with an electromagnet 76, which comprises a U-shaped core 77 and a winding 78. The core 77 is, like armature 75, of material of very high magnetic susceptibility. The winding 78 is also of extremely low resistance being made of relatively heavy wire. The winding 78 is connected through conductors 79 and 80 with a thermo-couple 82. The thermo-couple 82 is of conventional construction comprising two elements 83 and 84 of suitably dissimilar thermo-electric characteristics. Like the winding 78, the conductors 79 and 80 are of relatively large cross section and of high conductivity so as to offer as little impedance as possible to the current generated by the thermo-couple 82. By reason of this fact, the electromagnet 76 is able to hold the armature 75 in engagement with core 77 when the winding 78 is energized by reason of the thermo-couple 82 being heated by pilot burner 12. In spite of the high magnetic susceptibility of the armature and core members 75 and 77 and the low conductivity of the various electric conductors used in connection with the electromagnet 76, the electromagnet is not able to move the armature 75 into engagement therewith when once released. It is, accordingly, necessary to provide some means of so moving the armature 75. In the arrangement of the previously referred to Joesting application, this means was a manual one. According to the present invention, an automatically operated means is provided for performing this function.

The lower wall of casing member 53, which is designated by the reference numeral 87, is removably secured to the casing member for convenient access to the interior thereof. This lower wall or cover has secured thereto the electromagnet 76. The cover 87 also has slidably mounted therein an armature member 88. This armature member is provided with extensions 89 and 91. The lowermost extension 91 serves to slidably mount the armature 88 in the cover member 87 and the upper extension 89 is adapted to engage the left-hand end of lever 69. Cooperating with the armature 88 is a solenoid winding 90. Upon energization of the solenoid winding 90, the armature 88 is adapted to be moved upwardly to move the left-hand end of lever 69 upwardly in a manner to be described in more detail later.

The solenoid valve 62 comprises a valve member to which is secured a solenoid core 93 around which is located a winding 94. The upper end of armature 93 is adapted to engage a switch blade 95 which, in turn, is adapted to cooperate with a fixed contact 96. Upon energization of the winding 94, the core 93 is moved upwardly to open the valve and to move switch blade 95 into engagement with contact 96.

Controlling the energization of valve 62 and of the solenoid winding 90 and the ignition transformer 19 at certain times is a thermostat generally designated by the reference numeral 99. This thermostat may be located in the room being heated or at some other suitable control point. The thermostat is shown as comprising a bimetallic element 100 to which is secured a contact blade 101 adapted to sequentially engage with contacts 102 and 103. Upon a fall in temperature, blade 101 is first moved into engagement with contact 102 and subsequently into engagement with contact 103.

Also controlling the energization of the solenoid winding 90 and of the ignition transformer 19 is a switch comprising a switch blade 104 and a fixed contact 105. The switch blade 104 is yieldable in character and has its lefthand end secured to a block 107 of suitable insulating material which block is, in turn, secured to the cover member 87 of casing 53. Secured to switch blade 104 is an armature member 108. Armature 108 is, when the electromagnet 76 is deenergized, very slightly spaced from the core 77. By reason of the yieldability of switch blade 104 and by reason of the small spacing between the armature 108 and core 77, a very slight force is necessary to move the armature 108 into engagement with the core 77. As will be pointed out later, the electromagnet 76 is capable of exerting sufficient force when energized to effect such movement.

Secured to the lower cover member 87 is a switch casing 110. Located within this switch casing is a pair of fixed contacts 111 and 112. A switch blade member 113 is adapted to move into engagement with contacts 111 and 112 to electrically connect the same. This switch blade member 113 is connected to a push button 114 outside of the casing 110 and is biased out of engagement with contacts 111 and 112 by a spring 116. The contacts 111 and 112 are connected to the conductors 79 and 80 which, as previously explained, serve to connect the thermo-couple with the electromagnet. When the switch blade member 113 is moved inwardly to bridge contacts 111 and 112, thermo-couple 82 is short-circuited.

A step-down transformer 120 is used to supply low voltage power for the operation of the system. This transformer comprises a line voltage primary 121 connected to any suitable source of power (not shown) and a low voltage secondary 122.

*Operation*

The various elements of the system are shown in the position which they occupy when the system is completely shut down by the opening of a switch 124. Let it be assumed that this switch 124 is closed and the temperature to which thermostat 99 is subjected falls to the point at which switch blade 101 is in engagement with both contacts 102 and 103. Under these circumstances, the following circuit is established to the winding 94 of the solenoid valve 62: from the right-hand terminal of secondary 122 through conductor 125, switch 124, conductor 126, contact 102, switch blade 101, contact 103, conductors 127, 128, 129 and 130, winding 94, and conductors 131 and 132 to the other terminal of secondary 122. The establishment of this circuit results in the energization of the solenoid winding 94 and in the opening of the valve 62. The opening of the valve 62 is accompanied by the movement of switch blade 95 into engagement with contact 96. When this occurs, a holding circuit is established to the winding 94 as follows: from the right-hand end of secondary 122 through conductor 125, switch 124, conductor 126, contact 102, contact blade 101, bimetal 100, conductor 133, contact 96, switch blade 95, conductors 134, 129 and 130, winding 94, and conductors 131 and 132 to the other terminal of secondary 122. It will be noted that this new holding circuit is independent of the engagement of contact blade 101 with contact 103 so that the solenoid winding 94 will remain energized until switch blade 101 separates from contact 102. In this manner, a differential is interposed between the opening and closing of solenoid valve 62 to prevent a chattering action as the thermostat moves towards or recedes from its contact.

The valve 62 is, in effect, connected in series with valve 64 to control the flow of the gas from the interior of the upper casing 27 to the bleed gas burner 14. Until not only valve 62 but also valve 64 is opened, the gas passing through the passage 38 into the upper chamber 27 cannot escape. The result is that the pressure on the two sides of diaphragm 28 becomes the same so that valve 32 is held on its seat by the weight of the various parts and also by the gas pressure on the valve itself. In order to open the valve 32, it is accordingly necessary to not only open valve 62 in the manner previously described but also to open valve 64. Since it is undesirable to have the main valve 32 open before the pilot burner is ignited, the apparatus is designed to prevent opening of valve 64 in any manner whatsoever prior to the ignition of the pilot burner.

By the improved arrangement of the present device, the pilot burner is automatically ignited upon a call for heat by the thermostat 99, when extinguished. When the thermostat blade 101 engages both contacts 102 and 103, as previously described, a circuit is not only established to winding 94 but also to solenoid winding 90 as follows: from the right-hand end of secondary 122 through conductor 125, switch 124, conductor 126, contact 102, contact blade 101, contact 103, conductors 127, 128, 129, and 140, solenoid winding 90, conductors 141 and 142, switch blade 104, contact 105, and conductors 143 and 132 to the other terminal of secondary 122. As soon as switch blade 95 engages contact 96, a holding circuit is established to solenoid 90 as follows: from secondary 122 through conductor 125, switch 124, conductor 126, contact 102, contact blade 101, bimetal 100, conductor 133, contact 96, switch blade 95, conductors 134, 129, and 140, solenoid winding 90, conductors 141 and 142, switch blade 104, contact 105, and conductors 143 and 132 to the other terminal of secondary 122. As in the case of the holding circuit for winding 94, this holding circuit is independent of the engagement of switch blade 101 with contact 103. The energization of solenoid winding 90 causes the armature 88 to move upwardly and, as previously explained, to move the left-hand end of lever 69 upwardly. Inasmuch as the position of stem 65 is fixed since valve 64 is in engagement with its seat, the lever 69 pivots about the lower end of this valve stem. The result is that the portion of lever 69 to the right of valve stem 65 moves downwardly carrying with it the stem member 71 and armature 75. The downward movement of the right-hand portion of lever 69 also permits the spring 56 to move valve 51 to open position. The various elements are so designed that the movement of armature 88 is sufficient to carry armature member 75 into engagement with core 77 of the electromagnet 76. Thus as a result of the energization of winding 90, armature 75 is moved into engagement with the electromagnet 76 and valve 51 is allowed to be moved to open position by its biasing spring 56.

The movement of valve 51 to open position permits gas to flow to the pilot burner as follows: through pipe 46 into the lower casing member 26, through passage 47, valve chamber 48, passage 49, and pipe 13 to pilot burner 12. Simultaneously with the energization of the solenoid windings 94 and 90, the ignition transformer 19 is also energized as follows: from the right-hand terminal of secondary 122 through conductor 125, switch 124, conductor 126, contact 102, contact arm 101, contact 103, conductors 127 and 145, primary winding 20, conductors 146 and 142, switch blade 104, contact 105, and conductors 143 and 132 to the other terminal of secondary 122. As soon as the switch blade 95 engages contact 96, a holding circuit is established to primary 20 as follows: from the right-hand terminal of secondary 122 through conductor 125, switch 124, conductor 126, contact 102, contact blade 101, bimetal element 100, conductor 133, contact 96, switch blade 95, conductors 134, 128, and 145, primary winding 20, conductors 146 and 142, switch blade 104, contact 105 and conductors 143 and 132 to the other terminal of secondary 122. As in the case of the holding circuits for the other devices, it will be noted that the holding circuit for primary winding 20 is independent of contact 103. The result of the establishment of first the energizing circuit and then the holding circuit to primary winding 20 is that the ignition transformer 19 is energized and a spark is produced between electrodes 17 and 18. The gas being admitted to the pilot burner is now ignited by the spark with the result that the hot junction of thermocouple 82 begins to be heated. After this heating of the thermo-couple has been carried sufficiently far, an adequate electromotive force will be generated to cause the electromagnet 76 to be energized sufficiently to move armature 108 down into engagement therewith. As soon as this takes place, switch blade 104 is separated from contact 105. It will be noted that the establishment of the circuits both to the solenoid winding 90 and the primary 20 of the transformer 19 are dependent upon the engagement of switch blade 104 with contact 105. Accordingly, when the switch blade is thus separated from contact 105, both the solenoid winding 90 and the ignition transformer 19 are deenergized.

The deenergization of solenoid winding 90 permits the armature 88 to drop. Thus there is no longer a force applied to the left-hand end of lever 69. Due to the fact that the electromagnet 76 is now energized, the armature 75 will be held in engagement therewith in spite of the deenergization of the winding 90. Thus the biasing effect of spring 73 is overcome and the two biasing springs 67 and 56 are able to move their respective valves to open position, the lever 69 now pivoting about the point 70.

The movement of valve 64 to open position permits the gas accumulated in the upper casing member 27 to pass out through passages 58 and 59, valve chamber 60, pipe 61, valve 62, and pipe 15 to the bleed gas burner 14. Inasmuch as all of these passages are of much larger diameter than the passage 38 through the member 37, the gas is able to pass out of the upper casing faster than it is able to bleed into the same. The result is that the pressure on the under side of the diaphragm becomes greater than that on the upper side so that the valve 32 is moved off of its seat. As soon as valve 32 is moved off of its seat, the pressures on the two sides thereof are equalized with the result that an added lifting force results. Thus as soon as the valve leaves its seat, the valve is moved abruptly to full open position with a snap action. The opening of valve 32 admits gas to main burner 10, which gas is ignited by the pilot burner 12.

Under normal circumstances, the ignition means and the solenoid winding 90 will not be brought into operation upon every call for heat. So long as the electromagnet 76 remains energized by reason of the pilot burner being ignited so that switch blade 104 is out of engagement with contact 105, the position of valve 32 will be controlled solely by the opening and closing of valve 62. The pilot burner 12 will continue to burn and it is only when the pilot burner is extinguished that the cycle which has just been described is performed.

If for any reason, it is desired to shut down the system, the switch 124 is opened which prevents energization of the winding 94 of the solenoid valve 62 and hence prevents opening of the main valve 32. In order, however, to extinguish the pilot, it is necessary to deenergize the electromagnet 76. This is done by means of the switch comprising switch blade 113 and contacts 111 and 112. All that it is necessary to do is to push the push button 114 inwardly until switch blade 113 engages contacts 111 and 112. As previously stated, this results in the thermo-couple 82 being shorted out and almost immediately the electromagnet 76 becomes deenergized. This permits spring 73 to close the two valves 64 and 51, thus extinguishing the pilot and absolutely precluding any chances of the main valve being opened even though solenoid valve 62 should be opened in some way or other.

It will be seen that I have provided a new and novel burner control system in which the pilot burner is normally of the constant burning type but in which upon extinguishment of the pilot burner the same is automatically reignited upon a call for heat. It will further be seen that I have accomplished this in a relatively simple and inexpensive structure.

While I have shown a specific embodiment of my invention, it is to be understood that this is for purpose of illustration only and that the invention is to be limited only by the scope of the appended claims.

I claim as my invention:

1. In combination, a main valve, a pressure motor operatively connected to said valve, a control member controlling the pressure in said pressure motor and movable between a first position in which said main valve is closed and a second position in which said main valve is opened, electromagnetic means for controlling the position of said control member, said electromagnetic means comprising two members one an electromagnet and the other an armature and one of which is associated with said control member, said electromagnet being capable of holding but incapable of moving said members together, and supplementary power operated motor means for moving said electromagnet and said armature together.

2. In combination, a main valve, a pressure motor operatively connected to said valve, a control valve controlling the pressure in said pressure motor and movable between a first position in which said main valve is closed and a second position in which said main valve is opened, electromagnetic means for controlling the position of said control valve, said electromagnetic means comprising two members one an electromagnet and the other an armature and one of which is associated with said control valve, said electromagnet being capable of holding but incapable of moving said members together, supplementary power operated motor means for moving said electromagnet and said armature together, and means for deenergizing said motor means upon energization of said electromagnet.

3. In a fluid fuel burner control system, a main burner, a pilot burner, a main valve controlling the flow of fuel to said main burner, a pressure motor operatively connected to said main valve, a control valve controlling the pressure in said pressure motor and movable between a first position in which said main valve is closed and a second position in which said main valve is opened, electromagnetic means for controlling the position of said control valve, said electromagnetic means comprising two members one an electromagnet and the other an armature and one of which is associated with said control valve, said electromagnet being capable of holding but incapable of moving said members together, a thermo-couple having its hot junction adjacent the pilot burner and connected to said electromagnet for energizing the electromagnet when the latter is ignited, and supplementary power operated motor means for moving said electromagnet and said armature together.

4. In a fluid fuel burner control system, a main burner, a pilot burner, a main valve controlling the flow of fuel to said main burner, a pressure motor operatively connected to said main valve, a control valve controlling the pressure in said pressure motor and movable between a first position in which said main valve is closed and a second position in which said main valve is opened, electromagnetic means for controlling the position of said control valve, said electromagnetic means comprising two members one an electromagnet and the other an armature and one of which is associated with said control valve, said electromagnet being capable of holding but incapable of moving said members together, means responsive to a condition of the pilot flame controlling the energization of said electromagnet, supplementary power operated motor means for moving said electromagnet and said armature together, and means operative upon said electromagnet becoming energized to deenergize said power operated means.

5. In a fluid fuel burner control system, a main burner, a pilot burner, a main valve controlling the flow of fuel to said main burner, a pressure motor operatively connected to said main valve, a control valve controlling the pressure in said pressure motor and movable between a first position in which said main valve is closed and a second position in which said main valve is opened, electromagnetic means for controlling the position of said control valve, said electromagnetic means comprising two members one an electromagnet and the other an armature and one of which is associated with said control valve, said electromagnet being capable of holding but incapable of moving said members together, means responsive to a condition of the pilot flame controlling the energization of said electromagnet, supplementary power operated motor means for moving said electromagnet and said armature together, a thermostat responsive to the temperature of a controlling medium, and means including said thermostat operative when said thermostat is calling for heat and when said electromagnet is deenergized to energize said motor means.

6. In combination, a burner, a valve controlling the flow of fuel thereto, means biasing said valve towards closed position, means for overcoming the effect of the biasing means to hold said valve opened, said last named means comprising an electromagnet and an armature one of which is associated with said valve, means including a device responsive to a condition of said burner flame operative when said burner is ignited to energize said electromagnet sufficiently to hold but not to move said electromagnet and armature together, power operated motor means for moving said electromagnet and armature together, and means for deenergizing said motor means when said electromagnet becomes energized.

7. In combination, a burner, a valve controlling the flow of fuel thereto, means biasing said valve towards closed position, means for overcoming the effect of the biasing means to hold said valve opened, said last-named means comprising an electromagnet and an armature one of which is associated with said valve, means including a device responsive to a condition of said burner flame operative when said burner is ignited to energize said electromagnet sufficiently to hold but not to move said electromagnet and armature together, power operated motor means for moving said electromagnet and armature together, ignition means for said burner, and means operative upon a need for burner operation to energize said motor means and said ignition means if said electromagnet is deenergized.

8. In combination, a burner, a valve controlling the flow of fuel thereto, means biasing said valve towards closed position, means for overcoming the effect of the biasing means to hold said valve opened, said last-named means comprising an electromagnet and an armature one of which is associated with said valve, a thermo-couple having its hot junction adjacent to said burner and connected to said electromagnet so as to be operative when said burner is ignited to energize said electromagnet sufficiently to hold but not to move said electromagnet and armature together, power operated motor means for moving said electromagnet and armature together, and means for deenergizing said motor means when said electromagnet becomes energized.

9. In combination, a main burner, a main valve controlling the flow of fluid thereto, a normally constantly burning pilot burner, a pilot valve controlling the flow of fuel to said pilot burner and constituting the only means for interrupting the flow of fuel to the pilot burner, means including a device responsive to a controlling condition for controlling the operation of said main valve to cause the same to move between closed and open positions, electromagnetic means the energization of which is controlled solely in accordance with a condition of the pilot flame for maintaining said pilot valve open whenever said electromagnetic means is energized as the result of the pilot burner being ignited, ignition means, and means for opening said pilot valve and energizing said ignition means whenever said condition responsive device is calling for opening of the main valve and said electromagnetic means is deenergized.

10. In combination, a main burner, a main valve controlling the flow of fluid thereto, a normally constantly burning pilot burner, a pilot valve controlling the flow of fuel to said pilot burner and constituting the only means for interrupting the flow of fuel to the pilot burner, means including a device responsive to a controlling condition for controlling the operation of said main valve to cause the same to move between closed and open positions, electromagnetic means the energization of which is controlled solely in accordance with a condition of the pilot flame for maintaining said pilot valve open whenever said electromagnetic means is energized as the result of the pilot burner being ignited, means for causing both the closure of said pilot valve and said main valve when said electromagnetic means is deenergized, ignition means, and means for opening said pilot valve and energizing said ignition means whenever said condition responsive device is calling for opening of the main valve and said electromagnetic means is deenergized.

11. In combination, a main burner, a main valve controlling the flow of fuel thereto means including a device responsive to a controlling condition for controlling the operation of said main valve, a pilot burner for igniting the fuel delivered to said main burner, a pilot valve controlling the flow of fuel to said pilot burner, electrically operated power means energized by said condition responsive device upon a demand for burner operation to open said pilot valve in the event that said pilot valve is closed at the time, means for igniting the fuel delivered to said pilot, said ignition means being energized by said condition responsive device substantially simultaneously with said electrically operated power means, and means responsive to heat from said pilot burner maintaining said pilot valve open independently of said condition responsive device.

12. In combination, a main burner, a main valve controlling the flow of fuel thereto, means including a device responsive to a controlling condition for controlling the operation of said main valve, a pilot burner for igniting the fuel delivered to said main burner, a pilot valve controlling the flow of fuel to said pilot burner, electrically operated power means energized by said condition responsive device upon a demand for burner operation to open said pilot valve in the event that said pilot valve is closed at the time, means for igniting the fuel delivered to said pilot, said ignition means being energized by said condition responsive device substantially simultaneously with said electrically operated power means, and pilot flame responsive means including means maintaining said pilot valve open independently of said condition responsive device so long as said pilot burner remains ignited and means preventing the opening of the main valve by said condition responsive device unless said pilot burner is ignited.

13. Safety device for heating and other apparatus comprising, in combination, heat generating means, pilot means for said heat generating means, means to control the supply of operative energy to said heat generating means and said pilot means, an igniter for said pilot means, a thermocouple subject to the heat of said pilot means, an electromagnet connected in circuit with said thermocouple and adapted to cause said control means to supply operative energy to said heat generating means and said pilot means while said pilot means is operative and to shut off the supply of operative energy to said heat generating means and to said pilot means when said pilot means becomes inoperative, means for resetting said electromagnet and said control means to operative position to supply operative energy to the apparatus and for rendering said igniter operative, and means controlled by said thermocouple for rendering said resetting means and said igniter inoperative when said electromagnet is operative to cause said control means to supply operative energy to said heat generating means and to said pilot means.

14. Safety device for heating and other apparatus comprising, in combination, heat generating means, pilot means for said heat generating means, means to control the supply of operative energy to said heat generating means and said pilot means, an igniter for said pilot means, a thermocouple subject to the heat of said pilot means, an electromagnet connected in circuit with said thermocouple and adapted to cause said control means to supply operative energy to said heat generating means and said pilot means while said pilot means is operative and to shut off the supply of operative energy to said heat generating means and to said pilot means when said pilot means becomes inoperative, means for resetting said electromagnet and said control means to operative position to supply operative energy to the apparatus and for rendering said igniter operative, means controlled by said thermocouple for rendering said resetting means and said igniter inoperative when said electromagnet is operative to cause said control means to supply operative energy to said heat generating means and to said pilot means, and means subject to abnormal, defective, or insufficient or non-functioning of the apparatus for tripping said electromagnet to shut off the supply of operative energy to said heat generating means and said pilot means.

15. Safety device for heating and other apparatus comprising, in combination, heat generating means, pilot means for said heat generating means, means to control the supply of operative energy to said heat generating means and said pilot means, an igniter for said pilot means, a thermocouple subject to the heat of said pilot means, an electromagnet connected in circuit with said thermocouple and adapted to cause said control means to supply operative energy to said heat generating means and said pilot means while said pilot means is operative and to shut off the supply of operative energy to said heat generating means and to said pilot means when said pilot means becomes inoperative, means for resetting said electromagnet and said control means to operative position to supply operative energy to the apparatus and for rendering said igniter operative, means controlled by said thermocouple for rendering said resetting means and said igniter inoperative when said electromagnet is operative to cause said control means to supply operative energy to said heat generating means and to said pilot means, and means subject to abnormal, defective, or insufficient or non-functioning of the apparatus for tripping said electromagnet to shut off the supply of operative energy to said heat generating means and said pilot means, said resetting means and said igniter being controlled by another condition of the apparatus and by said thermocouple.

16. In a device of the character described, in combination, a burner, a fuel supply pipe leading to said burner, a valve in said pipe, a supply pipe for a pilot light in juxtaposition to said burner, an electromagnet, an armature for said electromagnet, means including said armature for opening said valve when said armature moves to attracted position and for closing said valve when said armature moves away from attracted position, a thermocouple placed in position to be heated by said pilot light and connected in circuit with said electromagnet, a second electromagnet connected in circuit with a source of current and adapted for resetting said armature to attracted position, an igniter for said pilot light connected in circuit with said second electromagnet, and relay means controlled by the thermo-electric current generated by the heat of the pilot light on the thermocouple for rendering said igniter and said second electromanet inoperative.

17. In a thermoelectric control apparatus, for a burner, the combination with a burner, a fuel supply pipe leading to said burner, a valve in said pipe, a pilot light in position to ignite said burner, an electromagnet, an armature for said electromagnet, means including said armature for opening said valve when said armature moves to attracted position and for closing said valve when said armature moves away from attracted position, and thermocouple placed in position to be heated by said pilot light and connected in circuit with said electromagnet so as to energize said electromagnet sufficiently to hold said armature in attracted position and said valve in open position, said valve being incapable of being actuated to open position by the thermo-electric current generated by the heat of the pilot light on said thermocouple, of a second electromagnet connected in circuit with a source of current and adapted for resetting said armature to attracted position, and means for interrupting the circuit through said second electromagnet upon completion of the resetting operation.

18. In a device of the character described, in combination, a burner, a fuel supply pipe leading to said burner, a valve in said pipe, a supply pipe for a pilot light in juxtaposition to said burner, an electromagnet, an armature for said electromagnet, means including said armature for opening said valve when said armature moves to attracted position and for closing said valve when said armature moves away from attracted position, a thermocouple placed in position to be heated by said pilot light and connected in circuit with said electromagnet, a second electromagnet connected in circuit with a source of current and adapted for resetting said armature to attracted position, means subject to the heat supplied by said burner for closing the circuit through said second electromagnet at a predetermined temperature, and means under the control of the thermoelectric current generated by the heat of the pilot light on said thermocouple for interrupting the circuit through said second electromagnet upon energization of said first electromagnet.

19. In a device of the character described, in combination, a burner, a fuel supply pipe leading to said burner, a valve in said pipe, a supply pipe for a pilot light in juxtaposition to said burner, an electromagnet, an armature for said electromagnet, means including said armature for opening said valve when said armature moves to attracted position and for closing said valve when said armature moves away from attracted position, a thermocouple placed in position to be heated by said pilot light and connected in circuit with said electromagnet, a second electromagnet connected in circuit with a source of current and adapted for resetting said armature to attracted position, means subject to the heat supplied by said burner for closing the circuit through said second electromagnet at a predetermined temperature, and a relay in the thermocouple circuit for interrupting the circuit through said second electromagnet upon energization of said first electromagnet.

20. In a device of the character described, in combination, a burner, a fuel supply pipe leading to said burner, a valve in said pipe, a supply pipe for a pilot light in juxtaposition to said burner, an electromagnet, an armature for said electromagnet, means including said armature for opening said valve when said armature moves to attracted position and for closing said valve when said armature moves away from attracted position, a thermocouple placed in position to be heated by said pilot light and connected in circuit with said electromagnet, a second electromagnet connected in circuit with a source of current and adapted for resetting said armature to attracted position, means subject to the heat supplied by said burner for closing the circuit through said second electromagnet at a predetermined temperature, ignition means for said pilot light, and a relay in the thermoelectric circuit for interrupting the circuit through said ignition means and the circuit through said second electromagnet upon energization of said first electromagnet.

21. In a control device for heating and other apparatus, in combination, a main burner, a fuel supply pipe leading to said burner, a valve in said pipe, a fuel supply pipe for a pilot light in juxtaposition to said burner, an electromagnet, an armature for said electromagnet, means including said armature for opening said valve when said armature moves to attracted position and for closing said valve when said armature moves away from attracted position, a thermocouple placed in position to be heated by said pilot light and connected in circuit with said electromagnet, a second electromagnet connected in circuit with a source of current and adapted for resetting said armature to attracted position, and means subject to a condition of the apparatus for closing the circuit through said second electromagnet automatically to reset said armature to attracted position so as to tend to establish and maintain a supply of fuel to said main burner when the functioning of the apparatus is such as to require the same.

22. In a device of the class described, in combination, heat generating means, means for controlling the supply of operative energy to said heat generating means, a pilot light for said heat generating means, a thermoelectric generator subject to the heat of said pilot light, an igniter for said pilot light, condition responsive means for rendering said igniter operative, and means connected in circuit with said thermoelectric generator and controlled by the thermoelectric current generated by the heat of the pilot light on said thermoelectric generator automatically to render said igniter inoperative upon energization of said thermoelectric generator.

23. In a device of the class described, in combination, a burner, a fuel supply pipe leading to said burner, a valve in said pipe, a pilot light in position to ignite said burner, an electromagnet, an armature for said electromagnet, means including said armature for opening said valve when said armature moves to attracted position and for closing said valve when said armature moves away from attracted position, a thermoelectric generator placed in position to be heated by said pilot light and connected in circuit with said electromagnet so as to energize said electromagnet sufficiently to hold said armature in attracted position so as to tend to cause said valve to be maintained in open position, an igniter for said pilot light, condition responsive means for rendering said igniter operative, and means connected in circuit with said thermoelectric generator and controlled by the thermoelectric current generated by the heat of the pilot light on said thermoelectric generator automatically to render said igniter inoperative upon energization of said thermoelectric generator.

24. In a device of the class described, in combination, a burner, a thermoelectric generator subject to the heat of said burner, an igniter for said burner, condition responsive means for rendering said igniter operative, and means connected in circuit with said thermoelectric generator and controlled by the thermoelectric current generated by the heat of the pilot light on said thermoelectric generator automatically to render said igniter inoperative upon energization of said thermoelectric generator.

25. In a safety control for fuel burners: fuel valve means including first and second valves in series, said valve means being effective to interrupt flow therethrough except when said first and second valves are both open; safety means for moving said first valve to closed position, said safety means comprising a thermocouple adapted to be exposed to the flame of a burner, an electromagnet connected to the thermocouple, an armature for the electromagnet movable toward and away from an attracted position, and means for moving said first valve to closed position when said armature is not held in attracted position; resetting means for moving said armature to attracted position; and a single means for controlling both said second valve and said resetting means.

26. In a safety control for fuel burners: fuel valve means for controlling the flow of fuel to a main burner and including first and second valves in series, said valve means being effective to interrupt flow therethrough except when said first and second valves are both open; safety means for moving said first valve to closed position, said safety means comprising a thermocouple adapted to be exposed to the flame of a pilot burner for said main burner, an electromagnet connected to the thermocouple, an armature for the electromagnet movable toward and away from an attracted position, and means for moving said first valve to closed position when said armature is not held in attracted position; a pilot burner valve for controlling the flow of fuel to a pilot burner; resetting means for moving said armature to attracted position and said pilot burner valve to open position; and a single means for controlling both said second valve and said resetting means.

27. Safety device for heating apparatus comprising, in combination, heat generating means, pilot means for said heat generating means, means to control the supply of operative energy to said heat generating means and said pilot means, an igniter for said pilot means, a thermocouple subject to the heat of said pilot means, an electromagnet connected in circuit with said thermocouple and adapted to cause said control means to supply operative energy to said heat generating means and said pilot means while said pilot means is operative and to shut off the supply of operative energy to said heat generating means and to said pilot means when said pilot means becomes inoperative, means for rendering said igniter operative and for resetting said electromagnet and control means to operative position to supply operative energy to the pilot means while preventing such operative energy from actually being supplied to the heat generating means while said resetting means is operative, and means controlled by said thermocouple for rendering said resetting means and said igniter inoperative when said electromagnet is operative to cause said control means to supply operative energy both to said heat generating means and to said pilot means.

DU WAYNE J. PETERSON.